United States Patent
Hobaugh, II

(10) Patent No.: US 7,047,836 B2
(45) Date of Patent: May 23, 2006

(54) SURFACE TREATMENT FOR A LOCKING MECHANISM

(75) Inventor: James M. Hobaugh, II, Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 278 days.

(21) Appl. No.: 10/061,584

(22) Filed: Feb. 1, 2002

(65) Prior Publication Data

US 2003/0145675 A1 Aug. 7, 2003

(51) Int. Cl.
*B62D 1/18* (2006.01)

(52) U.S. Cl. .......................................... 74/493; 280/775
(58) Field of Classification Search ................... 74/493; 188/251 A; 192/107 M; 428/293.7, 294.1, 428/297.4, 298.1, 298.7, 299.4, 299.7, 300.1
See application file for complete search history.

(56) References Cited

U.S. PATENT DOCUMENTS

| | | | | | |
|---|---|---|---|---|---|
| 2,728,701 | A | * | 12/1955 | Wirth | 192/107 M |
| 3,365,041 | A | * | 1/1968 | Stormfeltz | 192/107 M |
| 4,155,860 | A | | 5/1979 | Soucy | |
| 4,449,419 | A | | 5/1984 | Soler Bruguera | |
| 5,259,264 | A | | 11/1993 | Bodin et al. | |
| 5,989,375 | A | * | 11/1999 | Bortz | 156/148 |
| 6,048,677 | A | | 4/2000 | Chen et al. | |
| 6,260,674 | B1 | * | 7/2001 | Arai | 188/251 A |
| 6,467,591 | B1 | * | 10/2002 | Ohara | 188/251 A |

FOREIGN PATENT DOCUMENTS

| | | | |
|---|---|---|---|
| GB | 2 295 219 | | 5/1996 |
| JP | 10-35511 | * | 2/1998 |

* cited by examiner

*Primary Examiner*—William C. Joyce
(74) *Attorney, Agent, or Firm*—Tarolli, Sundheim, Covell & Tummino L.L.P.

(57) ABSTRACT

An apparatus (10) includes first and second plates (44 and 84) extending parallel to each other and movable relative to each other. A locking mechanism (140) prevents movement between the first and second plates (44 and 84). The locking mechanism (140) has a first position applying a force to urge the first and second plates (44 and 84) toward each other to prevent movement between the first and second plates. The locking mechanism (140) has a second position to permit relative movement between the first and second plates (44 and 84). A surface treatment on one of the first and second plates (44 and 84) and between the first and second plates resists relative movement between the first and second plates when the locking mechanism (140) is in the first position. The surface treatment lubricates relative movement between the first and second plates (44 and 84) when the locking mechanism (140) is in the second position.

8 Claims, 3 Drawing Sheets

US 7,047,836 B2

SURFACE TREATMENT FOR A LOCKING MECHANISM

FIELD OF THE INVENTION

The present invention relates to an adjustable steering column, and more specifically, to a surface treatment for plates of a locking mechanism for an adjustable steering column.

BACKGROUND OF THE INVENTION

A known steering column is disclosed in U.S. Pat. No. 5,259,264. U.S. Pat. No. 5,259,264 discloses an adjustable steering column having a locking mechanism. The locking mechanism includes a spring device on a shaft between packages of plates. The plates extend generally parallel to each other and move relative to each other during adjustment of the steering column. Levers are located between the spring device and the packages of plates. The spring device urges first ends of the levers away from each other and the plates into frictional engagement with each other to lock the steering column in position. A cable pulls second ends of the levers toward each other to permit adjustment of the steering column.

SUMMARY OF THE INVENTION

An apparatus of the present invention includes first and second plates extending generally parallel to each other and movable relative to each other. A locking mechanism prevents movement between the first and second plates. The locking mechanism has a first position applying a force to urge the first and second plates toward each other to prevent movement between the first and second plates. The locking mechanism has a second position to permit relative movement between the first and second plates. A surface treatment on one of the first and second plates and between the first and second plates resists relative movement between the first and second plates when the locking mechanism is in the first position. The surface treatment lubricates relative movement between the first and second plates when the locking mechanism is in the second position.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
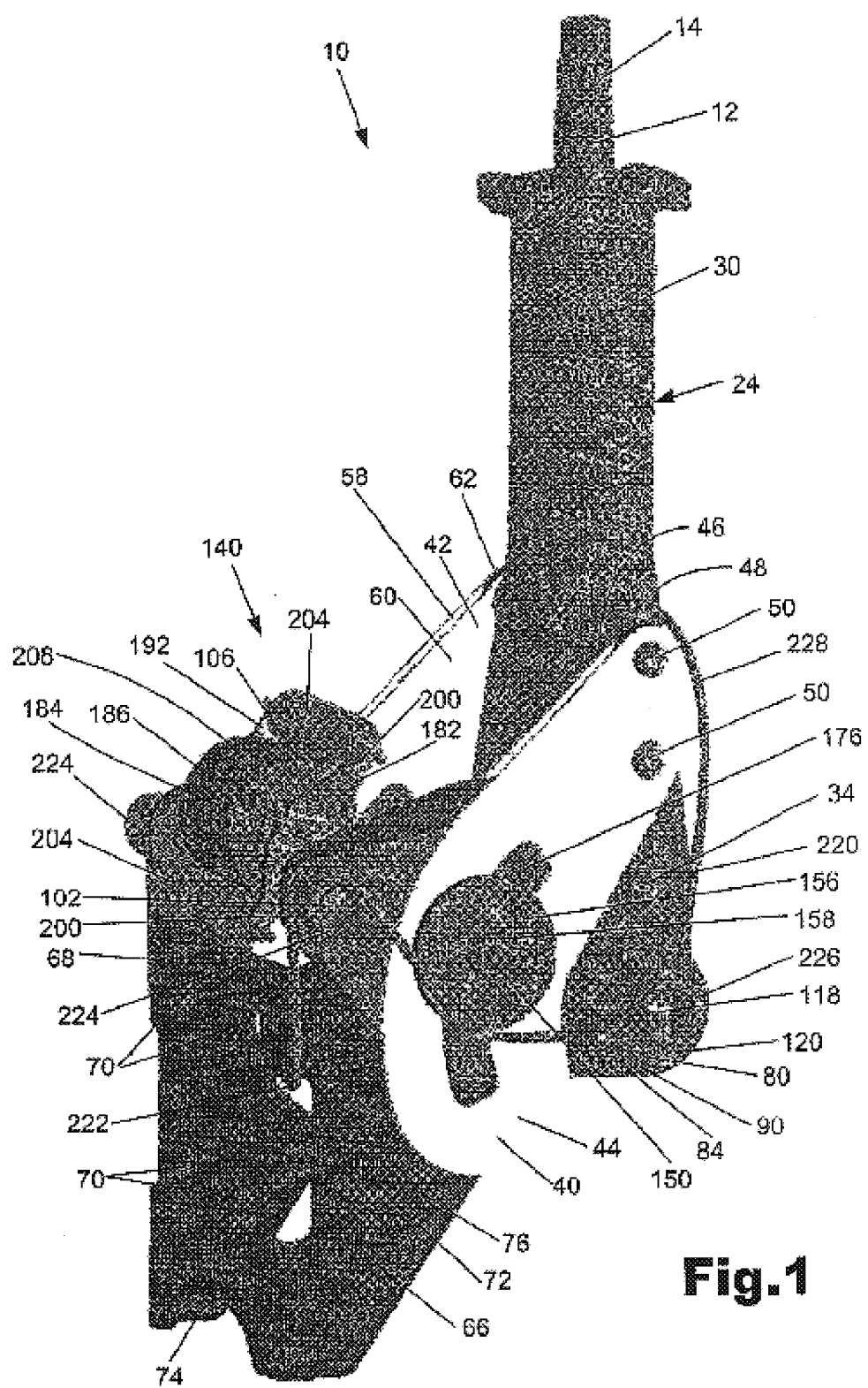
FIG. 1 is a schematic pictorial view of a steering column constructed in accordance with the present invention.
Figure 2:
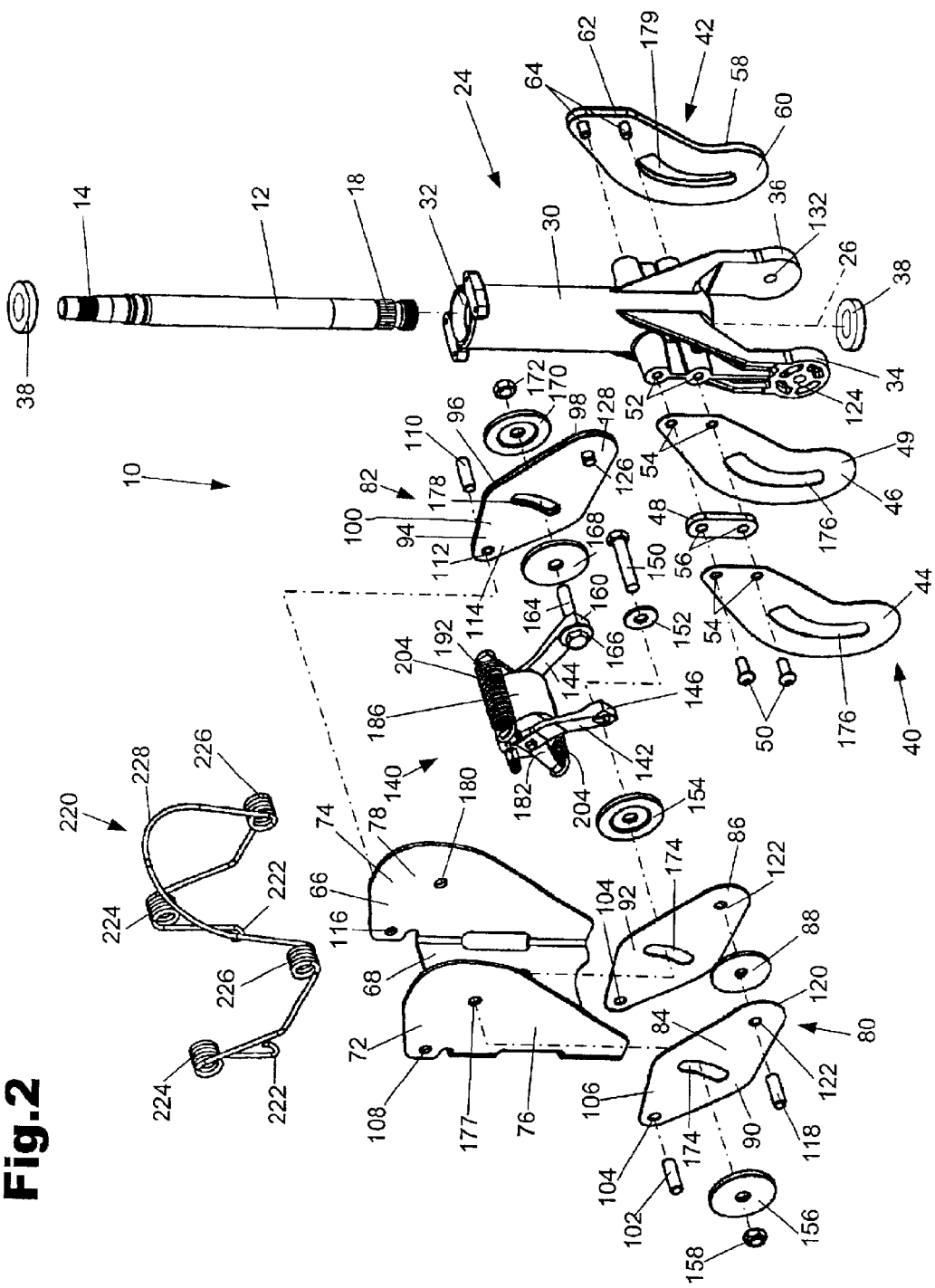
FIG. 2 is an exploded view of the steering column of FIG. 1 showing plates with a surface treatment in accordance with the present invention.

A vehicle steering column 10 constructed according to the present invention is illustrated in FIGS. 1 and 2. The steering column 10 includes a rotatable steering column member 12 to turn steerable vehicle wheels (not shown). The steering column member 12 has an end 14 connectable with a steering wheel (not shown) in a manner known in the art.

An end 18 (FIG. 2) of the steering column member 12 opposite from the end 14 is connectable with a universal joint (not shown). The universal joint connected with the end 18 of the steering column member 12 is connectable with a mechanism designed to transmit movement of the steering column member to a steering gear and permit movement of the steering column member relative to the mechanism, as known in the art.

A support 24 supports the steering column member 12 for rotation about a longitudinal axis 26 of the steering column member. Upon rotation of the steering wheel, the steering column member 12 rotates about the longitudinal axis 26. Upon rotation of the steering column member 12 about the longitudinal axis 26, steerable vehicle wheels (not shown) are turned, as known in the art.

The support 24 has a tubular portion 30 with a passage 32 through which the steering column member 12 extends. Arm portions 34 and 36 axially extend from the tubular portion 30. The tubular portion 30 is made by casting and may have any desired shape. Bearings 38 located in the passage 32 support the steering column member 12 for rotation relative to the support 24.

The support 24 includes locking portions 40 and 42 extending axially from opposite sides of the tubular portion 30. The locking portion 40 includes plates 44 and 46 extending generally parallel to each other. The plates 44 and 46 are fixedly connected to each other with a spacer 48 between them. The plate 46 has a surface 49 facing the plate 44. The plate 44 has a surface (not shown) extending parallel to the surface 49 and facing toward the plate 46.

The locking portion 40 is fixedly connected to the tubular potion 30 by fasteners 50, such as screws. The fasteners 50 threadably engage openings 52 in the tubular portion 30. The fasteners 50 extend through openings 54 in the plates 44 and 46 and through openings 56 in the spacer 48 to connect the locking portion 40 to the support 24.

The locking portion 42 is identical to locking portion 40 and, therefore, will not be described in detail. The locking portion 42 includes plates 58 and 60 extending generally parallel to each other. The plates 58 and 60 are fixedly connected to each other with a spacer 62 between them. The plates 58 and 60 have surfaces extending parallel to each other and facing toward each other. The locking portion 42 is fixedly connected to the tubular potion 30 by fasteners 64, such as screws. The fasteners 64 threadably engage openings in the tubular portion 30 and extend through openings in the plates 58 and 60 and through openings in the spacer 62.

A mounting bracket 66 (FIGS. 1 and 2) connects the steering column 10 with a vehicle frame. The mounting bracket 66 has a rear wall 68 with openings 70 for receiving fasteners to connect the mounting bracket to the vehicle frame. The mounting bracket 66 is connected to the vehicle frame using fasteners (not shown), such as bolts, as known in the art.

A pair of side walls or plates 72 and 74 extend from the rear wall 68 of the mounting bracket 66. The side plates 72 and 74 extend generally perpendicular to the rear wall 68 and parallel to each other. The side plates 72 and 74 (FIG. 2) also extend generally parallel to the plates 44, 46 and 58, 60 of the locking portions 40 and 42. The side plate 72 has a surface 76 facing away from the side plate 74 and a surface (not shown) facing toward the side plate 74. The side plate 74 has a surface 78 facing toward the side plate 72 and a surface (not shown) facing away from the side plate 72.

A pair of identical arms 80 and 82 interconnect the support 24 and the mounting bracket 66. The arm 80 includes a pair of plates 84 and 86 extending generally parallel to each other, the side plate 72 and the plates 44 and 46 of the locking portion 40. The plates 84 and 86 are fixedly connected together with a washer 88 between them. The side plate 72 of the mounting bracket 66 also extends between the plates 84 and 86. The plate 84 has a surface 90 facing away from the plate 86 and toward the plate 44 of the locking portion 40 and a surface (not shown) facing toward the surface 76 of the side plate 72. The plate 86 has a surface 92 facing toward the side plate 72 and a surface (not shown) facing the surface 49 on the plate 46 of the locking portion 40.

The arm 82 includes a pair of plates 94 and 96 extending generally parallel to each other, the side plate 74, and the plates 58 and 60 of the locking portion 42. The plates 94 and 96 are fixedly connected together with a washer 98 between them. The side plate 74 of the mounting bracket 66 also extends between the plates 94 and 96. The plate 94 has a surface 100 facing away from the plate 96 and toward the plate 60 of the locking portion 42 and a surface (not shown) facing toward the surface 78 on the side plate 74. The plate 96 has opposite surfaces (not shown) which face the plate 58 of the locking portion 42 and the side plate 74.

A pin 102 extends through openings 104 in an end 106 of the arm 80. The pin 102 is received in an opening 108 in the side plate 72 to pivotally connect the arm 80 to the side plate 72. A pin 110 extends through openings 112 in an end 114 of the arm 82. The pin 110 is received in an opening 116 in the side plate 74 to pivotally connect the arm 82 to the side plate 74. Accordingly, the arms 80 and 82 can pivot relative to the mounting bracket 66.

A pin 118 (FIGS. 1 and 2) pivotally connects an end 120 of the arm 80 to the support 24. The pin 118 (FIG. 2) extends through openings 122 in the end 120 and the washer 88 and into an opening 124 in the arm portion 34 of the support 24. A pin 126 pivotally connects an end 128 of the arm 82 with the arm portion 36 of the support 24. The pin 126 extends through openings in the end 128 and the washer 98 and into an opening 132 in the support 24. Accordingly, the support 24 can pivot relative to the arms 80 and 82.

A locking mechanism 140 (FIGS. 1 and 2) has a first or locked position in which the arms 80 and 82 are locked in any one of a plurality of pivot positions relative to the mounting bracket 66. The locking mechanism 140 also locks the support 24 in any one of a plurality of pivot positions relative to the arms 80 and 82 when in the first position. The locking mechanism 140 has a second or release position in which the arms 80 and 82 can pivot relative to the mounting bracket 66 and the support 24 can pivot relative to the arms to position the steering column member 12 relative to the mounting bracket. Accordingly, when the locking mechanism 140 is in the second position, the plates 44, 46, 58, 60, 84, 86, 94, and 96 and side plates 72 and 74 are movable relative to each other.

Figure 3:
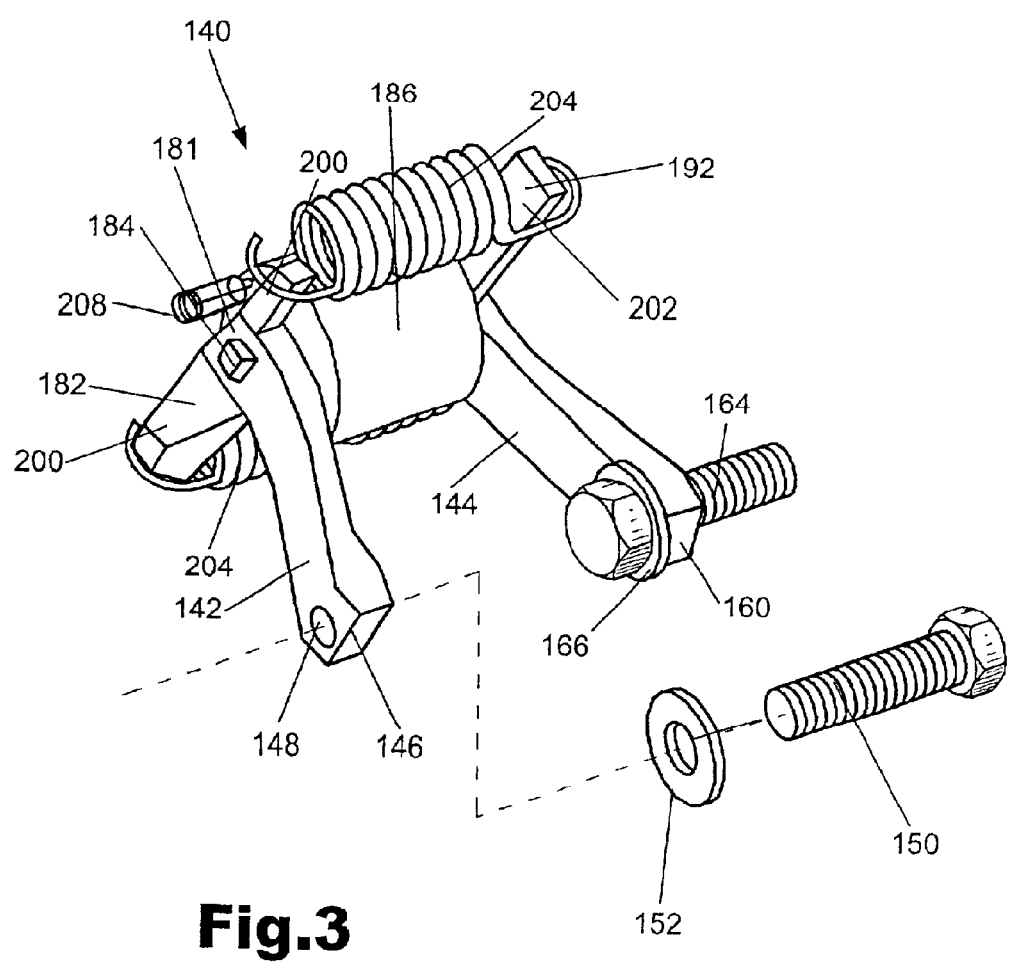
FIG. 3 is an enlarged view of a locking mechanism of the steering column of FIG. 1.

The locking mechanism 140 (FIGS. 2 and 3) includes locking levers 142 and 144 that apply a force to the plates 46 and 60 of the locking portions 40 and 42 of the support 24 to prevent movement of the support 24 relative to the mounting bracket 66. The lever 142 applies the force to urge the plate 46 and the plate 86 of the arm 80 toward each other. The plate 86 and the side plate 72 of the mounting bracket 66 are urged toward each other. The side plate 72 and the plate 84 of the arm 80 are urged toward each other and the plate 84 and the plate 44 of the support 24 are urged toward each other. The lever 144 applies the force to urge the plate 58 and the plate 96 of the arm 82 toward each other. The plate 96 and the side plate 74 of the mounting bracket 66 are urged toward each other. The side plate 74 and the plate 94 of the arm 82 are urged toward each other and the plate 94 and the plate 60 of the support 24 are urged toward each other. Accordingly, the side plates 72 and 74 of the mounting bracket 66 are clamped between the plates 84, 86 and 94, 96 of the arms 80 and 82 and the arms are clamped between the plates 44, 46 and 58, 60 of the support 24.

The surface (not shown) of the plate 44 facing toward the plate 84 of the arm 80 and/or the surface 90 of the plate 84 is coated with a surface treatment. The surface treatment resists relative movement between the plates 44 and 84 when the locking mechanism is in the first position and lubricates movement of the plates when the locking mechanism is in the second position. The surface 49 of the plate 46 and/or the surface (not shown) of the plate 86 facing toward the plate 46 are coated with the surface treatment. The surface 76 of the side plate 72 and/or the surface (not shown) of the plate 84 of the arm 80 facing toward the side plate 72 are coated with the surface treatment. The surface (not shown) of the side plate 72 facing toward the plate 86 of the arm 80 and/or the surface 92 of the plate 86 is coated with the surface treatment. The surface (not shown) of the plate 58 of the locking portion 42 facing the plate 96 of the arm 82 and/or the surface (not shown) of the plate 96 facing toward the plate 58 is coated with the surface treatment. The surface (not shown) of the plate 60 facing toward the plate 94 of the arm 82 and/or the surface 100 of the plate 94 is coated with the surface treatment. The surface 78 of the side plate 74 and/or the surface (not shown) of the plate 94 of the arm 82 facing toward the side plate 74 are coated with the surface treatment. The surface (not shown) of the side plate 74 facing toward the plate 96 of the arm 82 and/or the surface (not shown) of the plate 96 facing toward the side plate 74 is coated with the surface treatment.

The surface treatment includes a low friction carrier with an abrasive filler. The low friction carrier could be grease or oil and the abrasive filler could be glass, fiberglass, cinder and/or silica. When the locking mechanism 140 is in the first position in which the plates 44, 46, 58, 60, 72, 74, 84, 86, 94, and 96 are urged toward each other, the surface treatment on the plates resists relative movement between the plates. The abrasive filler in the low friction carrier digs into the plates to resist relative movement between the plates. When the locking mechanism 140 is in the second position in which the support 24 can move relative to the arms 80 and 82 and the mounting bracket 66, the surface treatment on the plates lubricates the relative movement between the plates. The low friction carrier coats the abrasive filler to prevent the filler from digging into the plates.

It is also contemplated that the surface treatment could be an abrasive material with a resilient coating, such as foam or rubber. The abrasive material could be glass, fiberglass, cinder, and/or silica. When the locking mechanism 140 is in the first position in which the plates are urged toward each other, the surface treatment on the plates resists relative movement between the plates. The abrasive filler extends through the resilient coating and digs into the plates to resist relative movement between the plates. When the locking mechanism 140 is in the second position in which the support 24 can move relative to the arms 80 and 82 and the mounting bracket 66, the surface treatment on the plates lubricates the relative movement between the plates. The resilient coating covers the abrasive material to prevent the abrasive material from digging into the plates.

The locking lever 142 (FIG. 3) has an end 146 with an opening 148 through which a locking shaft or bolt 150 extends. The bolt 150 (FIG. 2) also extends through washers 152, 154 and 156. The washer 154 is located between the end 146 and the plate 46 of the support 24. A nut 158 threadably engages the bolt 150 and presses the washer 156 against the plate 44 of the support 24. The locking lever 144 (FIG. 3) has an end 160 with an opening through which a locking shaft or bolt 164 extends. The bolt 164 (FIG. 2) also extends through washers 166, 168 and 170. The washer 168 is located between the end 160 and the plate 60 of the support 24. A nut 172 threadably engages the bolt 164 and presses the washer 170 against the plate 58 of the support 24.

The locking shaft 150 (FIG. 2) extends through arcuate slots 174 in the arm 80 and arcuate slots 176 in the locking portion 40 of the support 24. The arcuate slots 174 in the arm 80 are located between the ends 106 and 120 of the arm 80. The locking shaft 150 also extends through opening 177 in the side plate 72 of the mounting bracket 66. The locking shaft 164 extends through arcuate slots 178 in the arm 82 and arcuate slots 179 in the locking portion 42 of the support 24. The arcuate slots 178 in the arm 82 are located between the ends 114 and 128 of the arm 82. The locking shaft 164 also extends through opening 180 in the side plate 74 of the mounting bracket 66.

The locking lever 142 (FIG. 3) has an end 181 connected with a cross member 182 and a piston 184 that extends into a cylinder 186. The locking lever 144 has an end (not shown) opposite from the end 160 connected with a cross member 192 and the cylinder 186. The cross member 182 has opposite ends 200 and the cross member 192 has opposite ends 202. Coil springs 204 extend between the ends 200 and 202 of the cross members 182 and 192. The springs 204 apply a force to pull the end 181 of the locking lever 142 toward the end of the locking lever 144 opposite from the end 160 to urge the ends 146 and 160 away from each other. Accordingly, the ends 146 and 160 of the locking levers 142 and 144 apply force to the plates 46 and 60 of the locking portions 40 and 42 to clamp the arms 80 and 82 and the side plates 72 and 74 between the plates 44, 46 and plates 58, 60 of the support 24.

The cylinder 186 has a port 208 for receiving a pressurized fluid, such as air. The pressurized fluid moves the piston 184 and the cylinder 186 relative to each other against the force of the springs 204. Accordingly, when the pressurized fluid is applied to the piston 184, the force applied by the springs 204 is released and the steering support 24 can be positioned relative to the mounting bracket 66.

Although the locking mechanism 140 is shown as including the piston 184 and cylinder 186, it is contemplated that the locking mechanism could have another construction. The locking mechanism 140 may have any construction known in the art that applies enough force to clamp the arms 80 and 82 and the side plates 72 and 74 between the plates 44, 46 and 58, 60 to prevent movement of the support 24 relative to the mounting bracket 66.

A spring member 220 (FIGS. 1 and 2) urges the support 24 to pivot in a counter-clockwise direction, as viewed in FIGS. 1 and 2, relative to the arms 80 and 82 and the arms to pivot in a counter-clockwise direction relative to the mounting bracket 66. The spring member 220 (FIG. 2) has ends 222 that engage the mounting bracket 66 to connect the spring member to the mounting bracket. Coiled portions 224 of the spring member extend around and engage the pins 102 and 110. Coiled portions 226 extend around and engage the pins 118 and 126. A curved portion 228 of the spring member 220 extends between the coiled portions 226 and engages the support 24. The spring member 220 urges the steering column 10 into an out of the way position. Although the spring member 220 is shown as having coiled portions 224 and 226 and curved portion 228, it is contemplated that any mechanism may be used to urge the steering column 10 to the out of the way position. It is also contemplated that the steering column 10 may not be urged to the out of the way position.

When pressurized fluid is applied to the cylinder 186, the end 181 of the locking lever 142 and the end of the locking lever 144 opposite the end 160 are moved away from each other and the ends 146 and 160 are moved toward each other. When the ends 146 and 160 are moved toward each other, the support 24 may be pivoted relative to the arms 80 and 82 and the arms may be pivoted relative to the mounting bracket 66.

The arms 80 and 82 move relative to the bolts 150 and 164 and the mounting bracket 66. The locking portions 40 and 42 of the support 24 also move relative to the bolts 150 and 164 and the mounting bracket 66. The bolts 150 and 164 are engageable with opposite ends of the arcuate slots 174, 178 in the arms 80 and 82 and with opposite ends of the arcuate slots 176, 179 in the locking portions 40 and 42 of the support 24 to limit movement of the support and arms relative to the mounting bracket 66.

After the support 24 is positioned relative to the mounting bracket 66, the pressurized fluid is released from the cylinder 186. When the pressurized fluid is released from the cylinder 186, the end 181 of the locking lever 142 and the end of the locking lever 144 opposite the end 160 move toward each other and the ends 146 and 160 move away from each other. As the ends 146 and 160 move away from each other, the arms 80 and 82 and the side plates 72 and 74 are clamped between the plates 44, 46 and plates 58, 60 of the locking portions 40 and 42 of the support 24. The arms 80 and 82 and the side plates 72 and 74 are clamped to prevent movement of the support 24 relative to the mounting bracket 66.

Although the steering column 10 is shown as being constructed with arms 80 and 82 and the support 24, it is contemplated that the steering column may have any construction known in the art that has plates extending parallel to each other and movable relative to each other. It is also contemplated that the steering column may be a tilt only or telescope only steering column.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:

first and second plates extending generally parallel to each other and movable relative to each other;

a locking mechanism for preventing movement between said first and second plates, said locking mechanism having a first position applying a force to urge said first and second plates toward each other to prevent movement between said first and second plates, said locking mechanism having a second position to permit relative movement between said first and second plates; and a surface treatment on one of said first and second plates between said first and second plates, said surface treatment resisting relative movement between said first and second plates when said locking mechanism is in said first position, said surface treatment lubricating relative movement between said first and second plates when said locking mechanism is in said second position;

said first plate being connected with a support that supports a steering column member for rotation about a longitudinal axis of said steering column member, said first plate and said support being movable relative to said second plate.

2. An apparatus as defined in claim 1 wherein said surface treatment includes a low friction carrier with an abrasive filler.

3. An apparatus as defined in claim 2 wherein said low friction carrier is one of grease and oil.

4. An apparatus as defined in claim 2 wherein said abrasive filler is one of glass, fiberglass, cinder and silica.

5. An apparatus as defined in claim 1 wherein said surface treatment includes an abrasive material with a resilient coating.

6. An apparatus as defined in claim 5 wherein said abrasive material is one of glass, fiberglass, cinder and silica.

7. An apparatus as defined in claim 5 wherein said resilient coating is one of foam and rubber.

8. An apparatus as defined in claim 1 further including a mounting bracket that connects said first and second plates and said support to a vehicle frame, said support being movable relative to said mounting bracket, said locking mechanism preventing relative movement between said support and said mounting bracket when said locking mechanism is in said first position, said support being movable relative to said mounting bracket when said locking mechanism is in said second position.

* * * * *